United States Patent
Denby et al.

(10) Patent No.: US 6,976,062 B1
(45) Date of Patent: Dec. 13, 2005

(54) AUTOMATED SOFTWARE UPGRADE UTILITY

(75) Inventors: Philip M. Denby, Everett, WA (US); Douglas L. Hughes, Bellevue, WA (US); Jonathan D. Fletcher, Everett, WA (US)

(73) Assignee: Intermec IP Corp., Woodland Hills, CA (US)

( * ) Notice: Subject to any disclaimer, the term of this patent is extended or adjusted under 35 U.S.C. 154(b) by 858 days.

(21) Appl. No.: 09/664,459

(22) Filed: Sep. 18, 2000

Related U.S. Application Data
(60) Provisional application No. 60/155,502, filed on Sep. 22, 1999.

(51) Int. Cl.[7] .............................................. G06F 15/177
(52) U.S. Cl. ....................... 709/220; 709/203; 709/217; 709/218; 709/219; 709/221
(58) Field of Search ................................ 709/220, 221, 709/203, 217–219

(56) References Cited

U.S. PATENT DOCUMENTS

| | | | | |
|---|---|---|---|---|
| 6,006,034 A | * | 12/1999 | Heath et al. | 717/170 |
| 6,094,679 A | * | 7/2000 | Teng et al. | 709/220 |
| 6,151,643 A | * | 11/2000 | Cheng et al. | 710/36 |
| 6,167,567 A | * | 12/2000 | Chiles et al. | 717/173 |
| 6,378,069 B1 | * | 4/2002 | Sandler et al. | 713/153 |
| 6,587,684 B1 | * | 7/2003 | Hsu et al. | 455/419 |
| 6,614,804 B1 | * | 9/2003 | McFadden et al. | 370/468 |

* cited by examiner

*Primary Examiner*—Nabil El-Hady
(74) *Attorney, Agent, or Firm*—Seed IP Law Group PLLC

(57) ABSTRACT

The automated software upgrade utility allows a customer, product supplier or software vendor to upgrade the operating system, firmware, applications and data files on any product regardless of the product type and characteristics. This upgrade process can be invoked from a remote location or via interaction directly with the target device.

24 Claims, 4 Drawing Sheets

AUTOMATED SOFTWARE UPGRADE UTILITY

CROSS-REFERENCE TO RELATED APPLICATIONS

This application claims the benefit U.S. Provisional Patent Application No. 60/155,502 filed Sep. 22, 1999, and is incorporated by reference herein.

INCORPORATION BY REFERENCE OF COMPUTER PROGRAM LISTING APPENDIX

This application herein incorporates by reference the Computer Program Listing Appendix attached hereto as CD-ROMs entitled "Philip M. Denby, Douglas L. Hughes, and Jonathan D. Fletcher, "AUTOMATED SOFTWARE UPGRADE UTILITY," 480062.665, Creation Date: Mar. 26, 2004." This program listing is included on a total of two (2) compact discs. Compact discs "Copy 1" and "Copy 2" are identical copies. The files located on each compact disc copy include:

upgrade.c, Mar. 26, 2004, 269 KB
upgrade.h, Mar. 26, 2004, 24.5 KB
ngpblist.c, Mar. 26, 2004, 25 KB
upgrade.ini, Mar. 26, 2004, 20 KB
ngextm.h, Mar. 26, 2004, 19.5 KB

TECHNICAL FIELD

Embodiments of this invention relate to automatically upgrading software.

BACKGROUND AND SUMMARY

Automatic upgrade utilities are known in the prior art. However, prior art automatic upgrade utilities are not known to have provided firmware upgrades across an entire product line for units comprised of a plethora of different characteristics. In addition, prior art on automatic upgrade utilities are not known to operate across any network transports. Prior art on automatic upgrade utilities have rarely operated in the automatic data collection ("ADC") device platform environment.

Many suppliers customize their products according to customer requirements. This is especially true with regard to products related to automatic data collection ("ADC"). Accordingly, the precise characteristics of the products sold by the supplier, even within a single product line, vary greatly. In the prior art, upgrades required a confusing disk swapping process and/or a direct serial connection to the device that required considerable user attention to ensure the upgrade completed successfully. Upgrades frequently consumed several hours, as each detail of the product being upgraded had to be painstakingly checked and disks constantly swapped. Moreover, an operator needed to be present to swap the diskettes. The presence of the operator often meant that during business hours the ADC device platform was unavailable for data collection while an upgrade was being accomplished. Many users were extremely reluctant to perform the installation procedure themselves because they were afraid of making mistakes and they were also concerned that they did not possess the requisite technical understanding to complete the process successfully.

The following summary lists the issues resolved by implementing the automated upgrade process:

Reduce the downtime of the device due to an upgrade being performed

Reduce inputs required from the user to eliminate operator error

Reduce the time required to perform an upgrade, reduce manpower required

Increase the odds of having the upgrade process conclude successfully

Allow for scheduling of the upgrade during off-hours

Initiate simultaneous upgrades to multiple target devices

Allow for grouping of devices to reduce redundant operations

Perform the upgrade over a network to many devices as well as over a serial connection to a single device Allow for upgrades to occur from remote, centralized locations Support differing scopes of upgrades via the same utility, i.e. install a patch versus install a new version of the operating system Provide a single utility that can perform upgrades of a device's operating system, firmware, application and data files.

The automated software upgrade utility allows a customer, product supplier or software vendor to upgrade the operating system, firmware, applications and data files on any product regardless of the product type and characteristics. This upgrade process can be invoked from a remote location or via interaction directly with the target device.

The automated upgrade process is independent of the device hardware platform, operating system, the network transport utilized by the device, and the target device itself.

The automated software upgrade process also allows for modification of the hardware configuration of the target device, e.g., change and reformat a hard drive partition.

The automated upgrade utility may reside at remote sites, such as the user's place of business, and periodically query the product supplier for firmware upgrades. Alternatively, the upgrade utility may reside with the product supplier and periodically locate remote products and perform the upgrade process.

In both configurations, the software upgrade utility retains the ability to identify all pertinent product characteristics, freeing the developer of the firmware upgrade from concerns regarding installing the upgrade across a wide range of product characteristics and nearly endless possible configurations.

DETAILED DESCRIPTION

Figure 1:
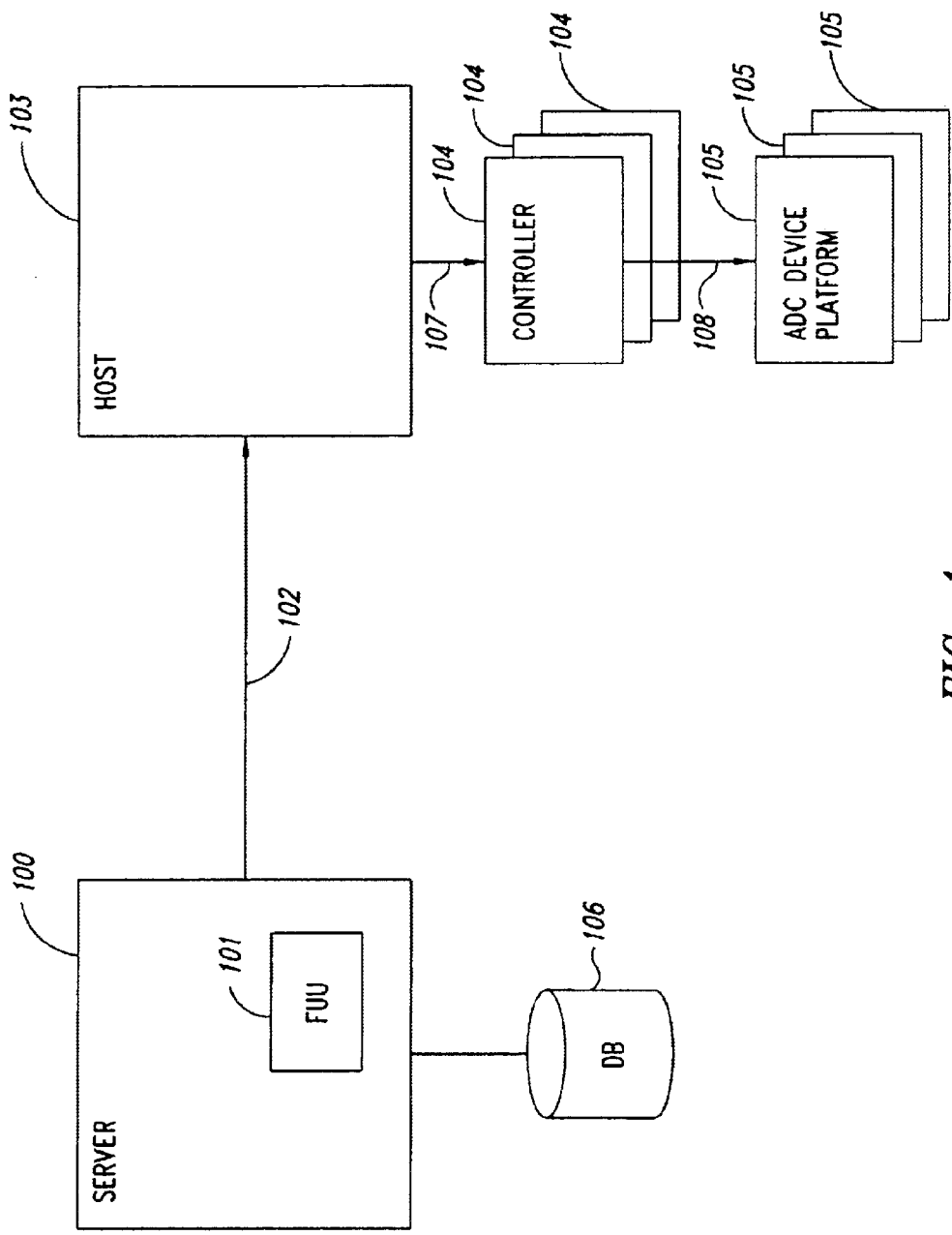
FIG. 1 is a block diagram illustrating a suitable environment for aspects of the invention.

The automated software upgrade utility enables a product supplier or software vendor to remotely upgrade the firmware on any of its products, such as automatic data collection ("ADC") device platforms, regardless of product type or product characteristics. The upgrade utility may reside at remote sites, such as the product owner's place of business, and periodically query the product provider for firmware upgrades. Alternatively, the upgrade utility may reside with the product provider and periodically locate products at a product owner's facility and perform the upgrade process. In both configurations, the software upgrade utility retains the ability to identify all pertinent product characteristics, freeing the developer of the firmware upgrade from concerns regarding installing the upgrade across a wide range of products, each having nearly endless possible configurations. The invention is applicable for both ADC device platforms, ADC servers, and associated devices such as printers and radios.

Upgrades may be classified from minor to severe. The minor upgrades are typically small software patches that have been determined not to pose a serious problem to other functionality. In contrast, severe upgrades constitute functionality that must be carefully provided to the product so as not disrupt the product or its functionality.

The Product Supplier or Software Vendor publishes a software update, i.e., patch, upgrade or new release. The published releases can either be pushed down to the software upgrade server or they can be pulled from the published location.

Once the software upgrade utility has received the published release, it can be distributed in one of four methods. The first being, the software upgrade utility can act as a publishing location for other software upgrade servers, i.e., push the software release to other software upgrade servers or allow them to pull the latest software releases from the master software upgrade server.

The second method is to schedule jobs within the software upgrade utility to push the software release to the target device(s), data collection devices registered in IDRS, at the requested time.

The third method involves when devices initially register with IDRS for the first time. If IDRS is configured such that a specific configuration must exist on the device, and software is a component of that standard configuration, then the designated files are automatically transmitted to the target device.

The fourth method involves a device that has an outdated version of the software resident. Upon startup of the device a check is done to ensure that the correct version(s) of the applicable software is resident, if not the device initiates the request for the upgrade to be initiated.

Following are the functional requirements for the automated upgrade utility:

Allow upgrades or replacement of a device's operating system, firmware, application and data files from a single utility.

Allow for scheduling of upgrades to occur at designated scheduled times or initiated manually at any time.

Allow for devices to be organized into logical groups to allow for a single event to initiate upgrades for multiple devices.

Allow for the upgrades to be performed via a remote, centralized location as well as from the location where the devices are physically located.

The upgrade process must be independent of the transport network that the device is attached to.

The upgrade process must support both devices that exist on wired networks as well as wireless networks.

The upgrade process itself must not involve any user involvement once it has been initiated.

Software to be upgraded can originate from any location, i.e. CD-ROM, telnet to the hard disk of system running the upgrade process, retrieved from a web site or bulletin board, etc.

If the nature of the upgrade requires the hardware configuration of the target device to change, then this must not require user intervention. It must be fully automated as well. An example is changing the size of the hard disk partitions or changing the operating system. After the upgrade is completed, the device must be returned back to a fully functional state such that it can be used in a production environment. All configuration parameters and applications must be restored to allow this to happen.

FIG. 1 illustrates a server 100 having a firmware upgrade utility 101. The server 100 may be operated by the producer of ADC device platform, for example. The firmware upgrade utility 101 utilizes a transportation network 102 to reach a host 103. The firmware upgrade utility 101 may perform its operations using any transportation network 102. The host 103 may comprise a centralized computing facility for a purchaser of the ADC device platforms products, for example. The host 103 in turn communicates with one or more controllers 104 over a transportation network 107 that in turn communicate with one or more ADC device platforms 105 over a transportation network 108. Each controller 104 typically communicates with one or more ADC device platforms 105. The firmware upgrade utility 101 may also perform its operations using any transportation network 107 and any, transportation network 108.

The upgrade utility 101 determines whether the upgrade concerns the controllers 104 and/or the ADC device platforms 105. The upgrade utility 101 locates the communications procedure for communicating with the host 103, the controllers 104, and if necessary with the ADC device platforms 105. The upgrade utility 101 then contacts the host 103 and uses resources on the host 103 to communicate with the controllers 104. For example, the host 103 may identify the type of the transportation network 107 to the upgrade utility 101. The upgrade utility 101 examines the controller 104 for its characteristics pertinent to the upgrade. Alternatively, the upgrade utility 101 may consult a database 106 that contains the characteristics of the controllers 104 and the ADC device platforms 105. The upgrade utility 101 then locates the appropriate upgrade, determines how to proceed with the upgrade given the controller's characteristics, and provides the controller 104 with the necessary upgrade. If the upgrade also applies to the ADC device platforms 105, then the upgrade utility 101 examines the ADC device platform 105 for its characteristics pertinent to the upgrade. Alternatively, the upgrade utility 101 may consult the database 106 for pertinent ADC device platform characteristics. The upgrade utility 101 then locates the appropriate upgrade, determines how to proceed with the upgrade given the ADC device platform's characteristics, and provides the ADC device platform 105 with the necessary upgrade. Finally, the upgrade utility 101 ensures that the controllers 104 and the ADC device platforms are returned to the same state they were in prior to the upgrade.

1.1. DCS Upgrade Utility 1.1.1. Purpose and use of feature

The DCS Upgrade Utility is a tool to manage the distribution of upgrade files placed on the Data Collection Server 300 (DCS 300). The DCS upgrade utility will allow the upgrade process to be started from the DCS 300, or from the ESD tool. The ESD tool can be at a remote site (remotely) or on the target DCS 300 (locally). The DCS upgrade utility will eliminate diskette swapping and prompting.

BIOS upgrades will continue to be accomplished by diskette.

There are four classifications of upgrades: Minor, Reboot, Shutdown, and Severe. A minor upgrade does not require rebooting or shutting processes down. A major C upgrade requires the DCS 300 to reboot. A major D upgrade requires some processes like data collection to shutdown. When the upgrade is finished, the stopped processes will be restarted. A severe upgrade is an upgrade that requires changing partition sizes and/or changing operating systems. This also requires the DCS 300 to reboot. If a severe upgrade is necessary, it will require an upgrade CD-ROM in the CD-ROM drive.

1.1.2. Results of feature usage

Previous upgrades required disk swapping and considerable user input. Sometimes the upgrade took hours. An operator needed to be present to swap diskettes. This usually meant that during business hours the controller was unavailable for data collection while an upgrade was being accomplished.

With the DCS Upgrade Utility in conjunction with the ESD tool, a DCS 300 software upgrade can be scheduled for an inactive time and doesn't require that an operator be present when the upgrade is being accomplished. The amount of time an upgrade takes to perform is also reduced.

Initiating an upgrade, from the System Maintenance Menu at the DCS 300, by selecting DCS Upgrade Utility, also requires little attention. Just start the upgrade and walk away.

1.1.3. Feature Options

The upgrade can be started remotely or at a DCS 300 using the ESD tool. A start time can be chosen so the upgrade doesn't interfere with data collection. The upgrade can also be started from the System Maintenance Menu at the DCS 300 by selecting DCS Upgrade Utility.

1.1.4. Assumptions

To use the DCS Upgrade Utility, the DCS software must be at 300 ver 1.0 or greater. Or, To use the DCS Upgrade Utility, the controller must be at 0200 ver 3.0 and have the DCS Upgrade Utility installed. In this case, if the upgrade is started from the controller, "g:\upgrade\upgrade" must be entered at the command line. The DCS Upgrade Utility can be installed from ESD or from a diskette.

The upgrade files can be transferred over to the DCS 300 by ESD, or FTP without the use of a CD-ROM. The upgrade files can be transferred from an Intermec Web page to a DCS 300 with ESD. Or, the upgrade files can be transferred from an Intermec Web page to a PC. Then, ESD or FTP in the binary mode can transfer the files to the DCS 300. If the upgrade files are to reside on the DCS 300, up to 120 MegaBytes must be available on drive d: of the hard drive depending on the size of the upgrade files.

An upgrade CD-ROM must be in the CD-ROM drive or these files need to be present in the d:\upgrade directory to start the upgrade:

| FILE | WHEN THE NEW FILE IS COPIED |
|---|---|
| upgrade.exe | only when the file changes |
| *.zip | every upgrade |

If a CD-ROM is used in the upgrade of an 0200 controller, the user will need to enable the parallel port in the BIOS at the beginning of the upgrade and disable the parallel port in the BIOS at the end of the upgrade. The DCS 0300 comes with a CD-ROM drive installed and no BIOS changes are necessary.

1.1.5. Interfaces to initiate or exercise the feature 1.1.5.1. Making upgrade files available to the DCS 0300

For each upgrade, new upgrade files will need to be made available to the DCS 300 before the upgrade is initiated. There are several methods to make the files available. The user can place a CD-ROM in the CD-ROM drive, or the user can put the files in the d:\upgrade directory with ESD or FTP. There are different ways to make the files available because some users do not have the capability to utilize TCP\IP and won't be able to use ESD remotely or won't be able to use FTP.

1.1.5.1.1.1.1. CD_ROM

When using a CD-ROM the user will place an Upgrade CD-ROM in the CD-ROM drive and initiate the upgrade from the System Maintenance Menu or from ESD (remotely of locally).

1.1.5.1.2. ESD Tool

When using the ESD tool remotely, the user will download a file (e.g. 300V1_0.zip) from an Intermec Web page to a PC. The ESD tool will unzip the file in a directory. The ESD tool will copy the upgrade files to the d:\upgrade directory on the target DCS 300. The user will then schedule the upgrade using the ESD tool. ESD will initiate the upgrade remotely at the appropriate time. To use this method, the target DCS 300 must have a LAN card installed with IP enabled.

Alternately, the user can put an upgrade CD-ROM in the CD-ROM drive at the target DCS 300 and schedule the upgrade from ESD (locally or remotely).

1.1.5.1.3. FTP

When using FTP, the user will download a file (e.g. 300V1_0.zip) from an Intermec Web page to a PC. The user will unzip the file in a directory. The user will login into the DCS 300 using FTP and set the binary mode. The user will change directories to d:\upgrade. Then, the user will copy all the files to the DCS 300. To use this method, the target DCS 300 must have a LAN card installed with IP enabled.

The upgrade can then be started at the DCS 300, from the System Maintenance Menu, or by ESD (remotely or locally).

1.1.5.2. Starting the DCS Upgrade Utility

An upgrade can be initiated from ESD remotely or locally or the upgrade can be started from the DCS 300 System maintenance menu.

See the ESD section for more information on initiating an upgrade from ESD.

Figure 2:
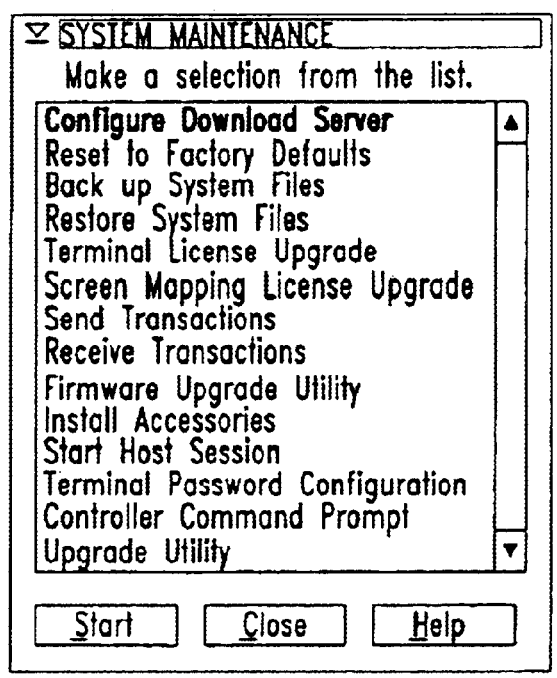
FIG. 2 is an example screen display of an example System Maintenance Menu.

Referring to FIG. 2, to initiate an upgrade from the DCS 300, select DCS Upgrade Utility from the System Maintenance Menu.

Figure 3:
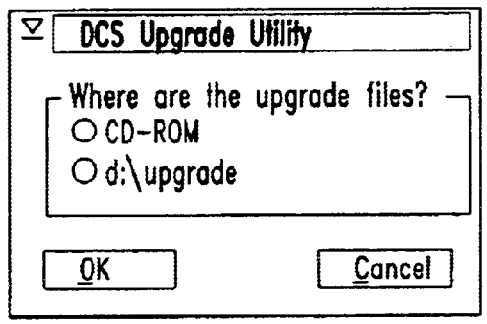
FIG. 3 is an example screen display of a source inquiry dialog box.
Figure 4:
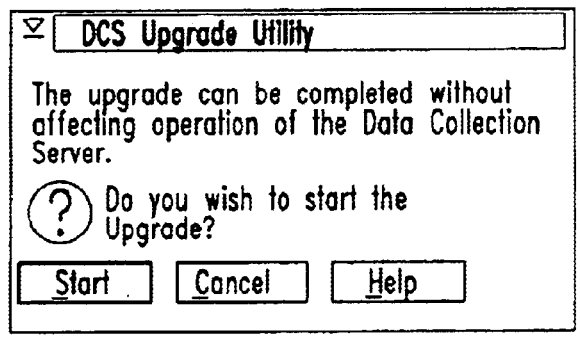
FIG. 4 is an example screen display of a minor upgrade confirmation dialog box.
Figure 5:
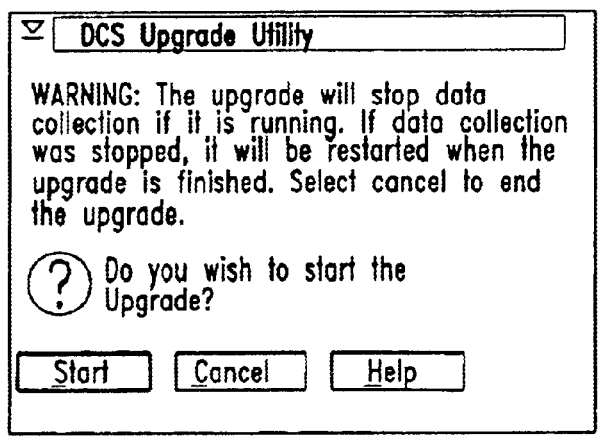
FIG. 5 is an example screen display of a major D upgrade confirmation dialog box.
Figure 6:
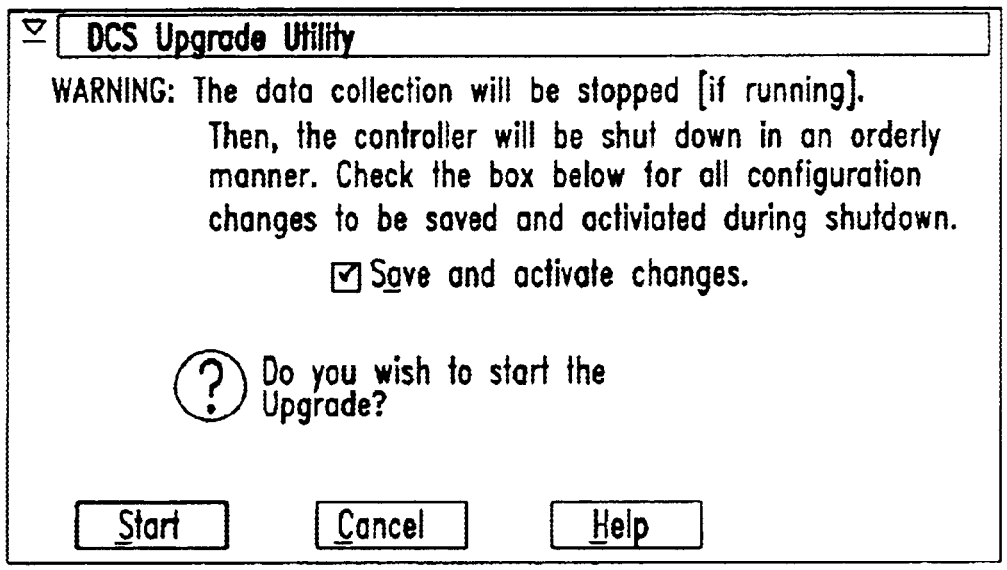
FIG. 6 is an example screen display of a major C upgrade confirmation dialog box.
Figure 7:
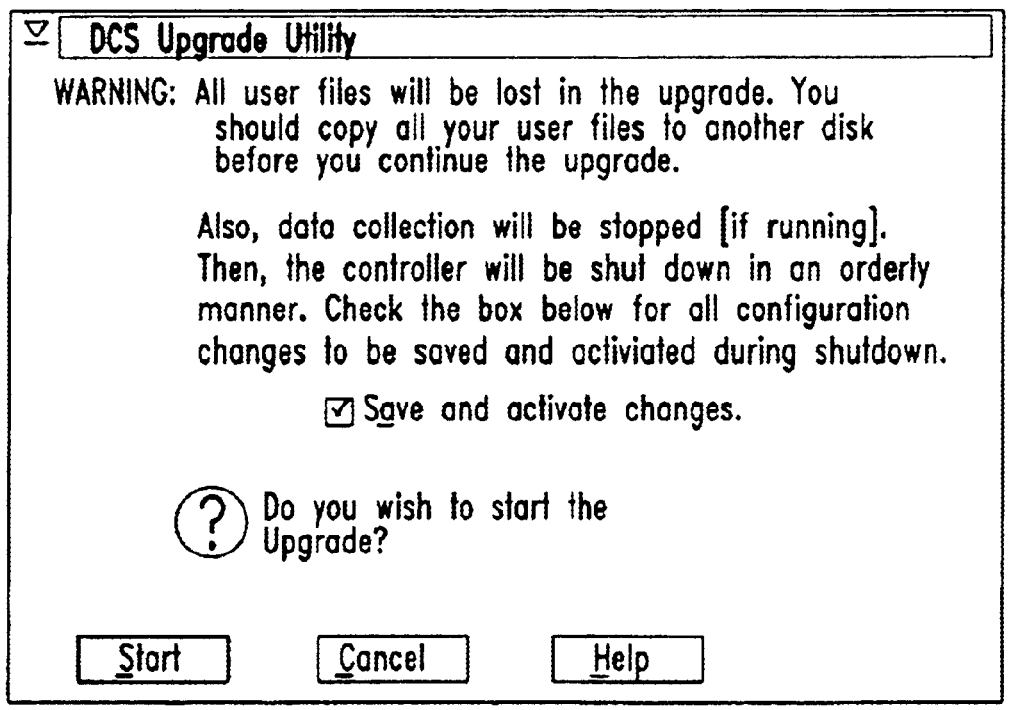
FIG. 7 is an example screen display of a severe upgrade confirmation dialog box.

When DCS Upgrade Utility has been selected a box will show that asks the source of the upgrade files. FIG. 3 is an example screen display of a source inquiry dialog box. Referring to FIG. 3, after the source of the upgrade files has been entered a menu will come up and ask if the user wants to start the upgrade or cancel. Pressing start will initiate the upgrade. Pressing cancel with end the upgrade.

Different upgrades will cause the DCS Upgrade Utility to present different confirmation dialog boxes to allow the user to have a last chance to cancel the upgrade. FIGS. 4–7 illustrate different dialog boxes that the DCS Upgrade Utility displays dependent upon the severity of the upgrade. Once a Start button has been pressed on any of the dialogs of FIGS. 4–7, the upgrade cannot be stopped.

1.1.5.3. Upgrade Behavior

When the upgrade is started, a file, upgrade.ini, is extracted from the zipped up files. This file contains the parameters of the upgrade, the software version of the upgrade, and a version controller.

The version controller is a list of versions of DCS 300 software that can be upgraded to its upgrade software version. The DCS 300's software version is compared to the version controller. If the DCS 300's software version is in the list, then the upgrade will proceed. A readme.doc can be found in the same directory as the upgrade files (d:\upgrade or CD-ROM). The readme.doc file contains information on what versions of DCS 300 software the upgrade files can upgrade.

The parameter list in the upgrade.ini file controls the upgrade behavior. It controls if the DCS 300 needs to reboot, shut down various DCS 300 processes, or proceed as is. The rebooting and process control is done automatically and requires no user input.

1.1.5.4. User Interface

A user at the DCS 300 during an upgrade will see various messages at a command prompt window on the DCS 300 screen depending on the size of the upgrade.

If the upgrade is a severe upgrade, the DCS 300 will reboot to an alternate operating system. These are the messages that can show on the screen based on additional upgrade.ini parameters:

- Backing up system files
- Deleting partitions
- Creating partitions
- Formatting partitions
- Restoring system files
- Checking video drivers
- Restoring configuration In addition to these messages, the user will see a list of files being copied to the appropriate directories after the partitions are formatted.

If the upgrade is a major C upgrade, the DCS 300 will reboot to an alternate operating system. These are the messages that can show on the screen based on additional upgrade.ini parameters:

- Backing up system files
- Restoring system files
- Checking video drivers
- Restoring configuration In addition to these messages, the user will see a list of files being copied to the appropriate directories after the system files are backed up.

If the upgrade is a major D upgrade, these are the messages that can show on command prompt window on the DCS 300 screen:

- stopping data collection
- starting data collection
- shutting down the DCS 300 GUI
- starting the DCS 300 GUI In addition to these messages, the user will see a list of files being copied to the appropriate directories after the processes have been shut down.

If the upgrade is a minor upgrade, then all the user will see is a list of files being copied to the appropriate directories.

The ESD tool can also inquire the version of the upgrade software on the DCS 300 and the version of the DCS 300 software to make sure the upgrade will proceed normally.

The DCS upgrade Utility will behave the same when the operating system is ported to Windows NT in a future release of the DCS 300.

1.2. DCS Upgrade Utility

Currently a new upgrade kit is developed for each release. The latest was on CD-ROM. Previous upgrade kits were on diskette and took a long time to install.

With the DCS Upgrade Utility, changes to the C: drive will be zipped up into a file called os_drive.zip. Changes to the D: drive drive will be zipped up into a file called nextgen.zip. And, changes to the F: drive will be zipped up into a file called boot.zip. The upgrade files will either be and placed in the D:\upgrade directory with the ESD tool, from CD-ROM, or with FTP if the upgrade is ran from the d:\upgrade drive. If the upgrade is ran from the CD-ROM, the zip files will need to be on the CD-ROM. The upgrade can then be initiated by selecting DCS Upgrade Utility from the System Maintenance Menu, scheduled and initiated by ESD, or from the command line. The DCS Upgrade Utility will allow zipped-up files, on CD-ROM or placed in the d:\upgrade, to be exploded into the appropriate directories.

1.2.1. Making the zip files

One zip file for each drive will be needed. The zip file will be made with the use of a batch file. The batch file will contain all the names and directories of the files that need to be updated. A typical command in the batch file to zip a single file is "zip -a os_-drive.zip c:\ibmcom\1e100t.rsp". This line adds (-a) c:\ibmcom\1e100t.rsp to the zip file os_drive.zip. To zip the entire ibmcom directory, use this command: "zip -a -r -S os_drive.zip c:\ibmcom". Because the files that need updated are different for each upgrade, new zip files will be needed for each The same upgrade.ini needs to be zipped up in every zip file. For REBOOT and SEVERE upgrades a list of backup files (upgdbkup.lst) will also need to be zipped up in the zip files. This upgrade.ini is used to verify that the zip file is valid. These are the valid zip file names:

- os_drive.zip—These are changes to the c: drive which contains the main operating system.
- nextgen.zip—These are changes to the d: drive which contains the DCS software. The changes to the upgrade.exe should not be in here unless the upgrade is SEVERE. This is because the upgrade.exe on the d:\upgrade directory will be running if the upgrade was initiated from the d:\upgrade drive.
- boot.zip—These are changes to the f: drive which is the alternate operating system used by SEVERE and REBOOT upgrades.

1.2.2. Upgrade Files

This is what the directory structure should look like on the CD-ROM and in the d:\upgrade directory:

```
Volume in drive D is UNOVA
Volume Serial Number is D0AD-8D81
Directory of D:(OR G:)\UPGRADE\
01/01/01  12:00a      <DIR>    .
01/01/01  12:00a      <DIR>    ..
12/08/97  01:17p        83,418,895 OS_DRIVE.ZIP
12/08/97  01:21p        12,131,654 NEXTGEN.ZIP
12/08/97  01:21p        12,131,654 BOOT.ZIP
12/08/97  01:21p        12,131,654 UPGRADE.EXE
09/04/97  08:31a      <DIR>    SVGA
09/04/97  08:31a      <DIR>    VGA
09/04/97  08:31a      <DIR>    TOOLS
         7 File(s)    95,550,549 bytes
Directory of D:(OR G:)\UPGRADE\SVGA
09/04/97  08:31a      <DIR>    .
01/01/01  12:00a      <DIR>    ..
01/22/94  11:29a        23,840 BVHSVGA.DLL
04/08/94  11:29a       123,645 IBMDEV32.DLL
```

-continued

| | | |
|---|---|---|
| 11/30/93 11:29a | 38,704 | IBMVGA32.DLL |
| 04/09/94 11:29a | 77,436 | VSVGA.SYS |
| 4 File(s) | 250,549 bytes | |

Directory of D:(OR G:)\UPGRADE\VGA
| | | |
|---|---|---|
| 09/04/97 08:31a | <DIR> | . |
| 01/01/01 12:00a | <DIR> | .. |
| 08/12/96 11:29a | 32,750 | BVHSVGA.DLL |
| 08/04/96 11:29a | 82,891 | IBMDEV32.DLL |
| 07/16/96 11:29a | 34,439 | IBMVGA32.DLL |
| 08/29/96 11:29a | 147,965 | VSVGA.SYS |
| 4 File(s) | 250,549 bytes | |

Directory of D:(OR G:)\UPGRADE\TOOLS
| | | |
|---|---|---|
| 09/04/97 08:31a | <DIR> | . |
| 01/01/01 12:00a | <DIR> | .. |
| 07/10/97 11:29a | 2,149 | CARD.IRQ |
| 06/05/97 01:58p | 138,291 | UNZIP.EXE |
| 8 File(s) | 233,628 bytes | |

Directory of D:(OR G:)\UPGRADE\TOOLS\CONFIG
| | | |
|---|---|---|
| 09/04/97 08:31a | <DIR> | . |
| 09/04/97 08:31a | <DIR> | .. |
| 09/04/97 08:31a | <DIR> | 1E |
| 09/04/97 08:31a | <DIR> | 1E100 |
| 09/04/97 08:31a | <DIR> | 1E100E |
| 09/04/97 08:31a | <DIR> | 1E100ET |
| 09/04/97 08:31a | <DIR> | 1E100T |
| 09/04/97 08:31a | <DIR> | 1E1T |
| 09/04/97 08:31a | <DIR> | 1T |
| 09/04/97 08:31a | <DIR> | 2E |
| 09/04/97 08:31a | <DIR> | 2E100 |
| 09/04/97 08:31a | <DIR> | 2E100T |
| 09/04/97 08:31a | <DIR> | 2E1T |
| 09/04/97 08:31a | <DIR> | LAN_LESS |
| 09/04/97 08:31a | <DIR> | LIC_STRT |
| 09/04/97 08:31a | <DIR> | ONE_RF |
| 07/19/96 03:34p | 37 | STARTUP.CMD |
| 09/04/97 08:31a | <DIR> | TWO_RF |
| 09/04/97 08:31a | <DIR> | T_AX_CM2 |
| 19 File(s) | 37 bytes | |

Directory of D:(OR G:)\UPGRADE\TOOLS\CONFIG\1E
| | | |
|---|---|---|
| 09/04/97 08:31a | <DIR> | . |
| 09/04/97 08:31a | <DIR> | .. |
| 06/04/97 08:30a | 761 | PROTOCOL.INI |
| 3 File(s) | 761 bytes | |

Directory of D:(OR G:)\UPGRADE\TOOLS\CONFIG\1E100
| | | |
|---|---|---|
| 09/04/97 08:31a | <DIR> | . |
| 09/04/97 08:31a | <DIR> | .. |
| 04/30/97 11:15a | 786 | PROTOCOL.INI |
| 3 File(s) | 786 bytes | |

Directory of D:(OR G:)\UPGRADE\TOOLS\CONFIG\1E100E
| | | |
|---|---|---|
| 09/04/97 08:31a | <DIR> | . |
| 09/04/97 08:31a | <DIR> | .. |
| 06/02/97 02:35p | 983 | PROTOCOL.INI |
| 3 File(s) | 983 bytes | |

Directory of D:(OR G:)\UPGRADE\TOOLS\CONFIG\1E100ET
| | | |
|---|---|---|
| 09/04/97 08:31a | <DIR> | . |
| 09/04/97 08:31a | <DIR> | .. |
| 06/02/97 02:22p | 1,367 | PROTOCOL.INI |
| 3 File(s) | 1,367 bytes | |

Directory of D:(OR G:)\UPGRADE\TOOLS\CONFIG\1E100T
| | | |
|---|---|---|
| 09/04/97 08:31a | <DIR> | . |
| 09/04/97 08:31a | <DIR> | .. |
| 04/30/97 11:17a | 1,160 | PROTOCOL.INI |
| 3 File(s) | 1,160 bytes | |

Directory of D:(OR G:)\UPGRADE\TOOLS\CONFIG\1E1T
| | | |
|---|---|---|
| 09/04/97 08:31a | <DIR> | . |
| 09/04/97 08:31a | <DIR> | .. |
| 06/04/97 08:31a | 1,134 | PROTOCOL.INI |
| 3 File(s) | 1,134 bytes | |

Directory of D:(OR G:)\UPGRADE\TOOLS\CONFIG\1T
| | | |
|---|---|---|
| 09/04/97 08:31a | <DIR> | . |
| 09/04/97 08:31a | <DIR> | .. |
| 05/01/96 02:07p | 938 | PROTOCOL.INI |
| 3 File(s) | 938 bytes | |

Directory of D:(OR G:)\UPGRADE\TOOLS\CONFIG\2E
| | | |
|---|---|---|
| 09/04/97 08:31a | <DIR> | . |
| 09/04/97 08:31a | <DIR> | .. |
| 06/04/97 08:31a | 962 | PROTOCOL.INI |
| 3 File(s) | 962 bytes | |

-continued

Directory of D:(OR G:)\UPGRADE\TOOLS\CONFIG\2E100
| | | |
|---|---|---|
| 09/04/97 08:31a | <DIR> | . |
| 09/04/97 08:31a | <DIR> | .. |
| 04/30/97 11:18a | 1,013 | PROTOCOL.INI |
| 3 File(s) | 1,013 bytes | |

Directory of D:(OR G:)\UPGRADE\TOOLS\CONFIG\2E100T
| | | |
|---|---|---|
| 09/04/97 08:31a | <DIR> | . |
| 09/04/97 08:31a | <DIR> | .. |
| 04/30/97 11:19a | 1,393 | PROTOCOL.INI |
| 3 File(s) | 1,393 bytes | |

Directory of D:(OR G:)\UPGRADE\TOOLS\CONFIG\2E1T
| | | |
|---|---|---|
| 09/04/97 08:31a | <DIR> | . |
| 09/04/97 08:31a | <DIR> | .. |
| 06/04/97 08:31a | 1,342 | PROTOCOL.INI |
| 3 File(s) | 1,342 bytes | |

Directory of D:(OR G:)\UPGRADE\TOOLS\CONFIG\LAN_LESS
| | | |
|---|---|---|
| 09/04/97 08:31a | <DIR> | . |
| 09/04/97 08:31a | <DIR> | .. |
| 02/28/96 11:54a | 216 | NGSETUP.CMD |
| 10/02/95 10:25a | 627 | PROTOCOL.INI |
| 02/28/96 11:54a | 1,509 | TCPSTART.CMD |
| 5 File(s) | 2,352 bytes | |

Directory of D:(OR G:)\UPGRADE\TOOLS\CONFIG\LIC_STRT
| | | |
|---|---|---|
| 09/04/97 08:31a | <DIR> | . |
| 09/04/97 08:31a | <DIR> | .. |
| 04/04/96 07:41a | 17 | DCMF1.LIC |
| 02/08/96 03:13p | 17 | DCMF2.LIC |
| 02/08/96 03:15p | 17 | DCMF3.LIC |
| 06/20/96 12:54p | 17 | DCML1.LIC |
| 04/04/96 07:42a | 17 | DCML2.LIC |
| 02/08/96 03:14p | 17 | DCML3.LIC |
| 03/21/97 07:38a | 1,271 | NGSYS.BAK |
| 06/26/97 12:54p | 1,256 | NGSYS.INI |
| 02/08/96 03:14p | 17 | NOLIMIT.LIC |
| 02/08/96 03:15p | 17 | NOLIMITF.LIC |
| 12 File(s) | 2,663 bytes | |

Directory of D:(OR G :)\UPGRADE\TOOLS\CONFIG\ONE_RF
| | | |
|---|---|---|
| 09/04/97 08:31a | <DIR> | . |
| 09/04/97 08:31a | <DIR> | .. |
| 06/02/97 02:07p | 388 | NET.CFG |
| 3 File(s) | 388 bytes | |

Directory of D:(OR G:)\UPGRADE\TOOLS\CONFIG\TWO_RF
| | | |
|---|---|---|
| 09/04/97 08:31a | <DIR> | . |
| 09/04/97 08:31a | <DIR> | .. |
| 06/02/97 02:08p | 217 | NET.CFG |
| 3 File(s) | 217 bytes | |

Directory of D:(OR G:)\UPGRADE\TOOLS\CONFIG\T_AX_CM2
| | | |
|---|---|---|
| 09/04/97 08:31a | <DIR> | . |
| 09/04/97 08:31a | <DIR> | .. |
| 11/01/95 04:43p | 4,841 | TWAX_CM2.CF2 |
| 11/01/95 04:43p | 28,928 | TWAX_CM2.CFG |
| 11/01/95 04:43p | 2,782 | TWAX_CM2.NDF |
| 11/01/95 04:43p | 325 | TWAX_CM2.SEC |
| 6 File(s) | 36,876 bytes | |
| Total Files Listed: | | |
| 126 File(s) | 96,573,903 bytes | |

If an upgrade is to be performed from the d:\upgrade drive, and changes to this directory tree should be copied over before upgrade begins.

1.2.3. Starting the DCS Upgrade Utility

The DCS upgrade utility can be started from ESD, from the System Maintenance Menu, or from the command line. The Upgrade Utility is a stand alone application with the following command line syntax:

upgrade [q or s]

The qualifier "q" is optional. It is used to pre-test the upgrade to see if it will proceed normally. The "s" qualifier is used to indicate that a save and activate will be done if it is necessary. Either the to "q" or "s" is used, not both at the same time.

1.2.3.1. ESD

IF ESD is used, ESD will first send a system transaction to the message handler with these one of these sets of parameters:

"d:\upgrade\upgrade /q"-The query of the upgrade started from the d: drive.

"g:\upgrade\upgrade /q"-The query of the upgrade started from the CD-ROM

A query will just run the phase 0 part of the upgrade and place the results in a file (upgrade.log). The results include error messages, parameters of the upgrade, the current phase of the upgrade, and the size of the disk drive. ESD will check upgrade.log for error messages. If error messages are found it will not proceed with the upgrade. If no error messages are found, ESD will send a system transaction to the message handler with these parameters:

"\f:\upgrade\upgrade"—The upgrade started from the d: drive

"g:\upgrade\upgrade—The upgrade started from the CD-ROM

"/f:\upgrade\upgrade /s"—The upgrade started from the d: drive and a save and activate will be done if necessary.

"/g:\upgrade\upgrade /s"—The upgrade started from the CD-ROM and a save and activate will be done if necessary

1.2.3.2. System Maintenance Menu

When the upgrade is started from the system maintenance menu, upgrade.exe is started by 300UgradeUtil in ngpblist.c. 300UgradeUtil will prompt the user for the source of the upgrade file, then call upgrade.exe with these parameters:

"d:\upgrade\upgrade /q"—The query of the upgrade started from the d: drive.

\"g:\upgrade\upgrade /q"—The query of the upgrade started from the CD-ROM

When the query is done 300UgradeUtil will parse upgrade.log for error messages. If error messages are found, a message will be displayed on a message box on the GUI and the upgrade will end. If there was no errors, upgrade.ini will be parsed again for the parameters of the upgrade, and prompt for a last chance cancel or start based on the parameters. If start is selected, 300UgradeUtil will call upgrade.exe with these parameters:

"\f:\upgrade\upgrade"—The upgrade started from the d: drive

"g:\upgrade\upgrade—The upgrade started from the CD-ROM

"/f:\upgrade\upgrade /s"—The upgrade started from the d: drive and a save and activate will be done if necessary.

"/g:\upgrade\upgrade /s"—The upgrade started from the CD-ROM and a save and activate will be done if necessary

1.2.3.3. Command Line

When the upgrade is started from the command line, the user will enter send "f:\upgrade\upgrade" or "g:\upgrade\upgrade". This should only be used when a 0200 Controller is upgraded to DCS 300, ver 1.0. No save and activate will be done.

1.2.4. Upgrade control

In phase 0 of the upgrade, upgrade.ini will be extracted from each zip file. This file will contain the type of the upgrade, the subsections of the type of upgrade, the software version of the upgrade, the version level, and a version controller. The parameters will be used to select the sections of the upgrade that need to be performed. As enhancements are made to the DCS 300, and new sections to the upgrade process are identified, additional parameters can be added to this file and the upgrade executable. The upgrade.ini file is also for security. If the file cannot be extracted from a zip file then the upgrade will not proceed. An upgrade.ini file typically contains the following tags and parameter definitions:

```
[Version_Level]
    Version = 300 x.x
[Upgrade]
    Type = {SEVERE, MINOR, REBOOT, or SHUTDOWN}
    Version = DCS 300 x.x
[Changed_Software]
    OS = {YES or NO}
    NEXTGEN = {YES or NO}
    SWAPPER = {YES or NO}
    BOOT = {YES or NO}
    BOOT_MANAGER = {YES or NO}
[Changed_Partitions]
    OS = {YES or NO}
    NEXTGEN = {YES or NO}
    SWAPPER = {YES or NO}
    BOOT = {YES or NO}
    BOOT_MANAGER = {YES or NO}
[OS]
    START = {BOTTOM or TOP}
    File_System = (FAT or HPFS}
    Vtype = {PRIMARY or SECONDARY}
    540_NAME = (currently 0000003f}
    540_SIZE = {the size of the new partition}
    2200_NAME = {e.g. 0000003f}
    2200_SIZE = {the size of the new partition}
    2500_NAME = {currently 0000003f}
    2500_SIZE = {the size of the new partition}
[SWAPPER]
    START = {BOTTOM or TOP}
    File_System = {FAT or HPFS}
    Vtype = {PRIMARY or LOGICAL}
    540_NAME = {e.g. 0000003f}
    540_SIZE = {the size of the new partition}
    2200_NAME = {e.g. 0000003f}
    2200_SIZE = {the size of the new partition}
    2500_NAME = {e.g. 0000003f}
    2500_SIZE = {the size of the new partition}
    Restore_START = {BOTTOM or TOP}
    Restore_File_System = {FAT or HPFS}
    Restore_Vtype = {PRIMARY or LOGICAL}
    Restore_540_SIZE = {the size of the new partition}
    Restore_2200_SIZE = {the size of the new partition}
    Restore_2500_SIZE = {the size of the new partition}
[NEXTGEN]
    START = {BOTTOM or TOP}
    File_System = {FAT or HPFS}
    Vtype = {PRIMARY or SECONDARY}
    540_NAME = {e.g. 0000003f }
    540_SIZE = {the size of the new partition}
    2200_NAME = {e.g. 0000003f}
    2200_SIZE = {the size of the new partition}
    2500_NAME = {e.g. 0000003f}
    2500_SIZE = {the size of the new partition}
    Restore_START = {BOTTOM or TOP}
    Restore_File_System = {FAT or HPFS}
    Restore_Vtype = {PRIMARY or LOGICAL}
    Restore_540_SIZE = {the size of the new partition}
    Restore_2200_SIZE = {the size of the new partition}
    Restore_2500_SIZE = {the size of the new partition}
[BOOT]
    START = {BOTTOM or TOP}
    File_System = {FAT or HPFS}
    Vtype = {PRIMARY or LOGICAL}
    540_NAME = {e.g. 0000003f }
    540_SIZE = {the size of the new partition}
    2200_NAME = {e.g. 0000003f}
    2200_SIZE = {the size of the new partition}
    2500_NAME = {e.g. 0000003f}
    2500_SIZE = {the size of the new partition}
[BOOT_MANAGER]
    START = {BOTTOM or TOP}
    Vtype = {PRIMARY or LOGICAL}
    540_NAME = {e.g. 0000003f}
```

-continued

```
        2200_NAME = {e.g. 0000003f}
        2500_NAME = {e.g. 0000003f}
[Processes]
        NextgenGui = {YES or NO}
        DataCollection = {YES or NO}
        FUU = {YES or NO}
        ViDaemon = {YES or NO}
[Disk_Size]
        Num_Cylinders_540_D_Drive = {e.g. 97}
        Num_Cylinders_2200_D_Drive = {e.g. 97}
        Num_Cylinders_2500_D_Drive = {e.g. 97}
[VIDEO_FIX]
        Flix_Config = {YES or NO}
        Copy_Files = {YES or NO}
[Version_Controller]
        Range = {0200 Ver 3.0, DCS 300 Ver x.x–y.y, z.z}
```

1.2.4.1. Version level

The version level refers to the parameters that can be stored in upgradc.ini. Upgrade.exe (Upgrade.c) contains a version level also. This version level refers to the parameters that upgrade.exe can read. The version numbers must match. When upgrade.exe is ran, it will compare the two version numbers. If the numbers don't match, the upgrade will end.

1.2.4.2. Upgrade

The Upgrade header contains the type of upgrade and the version of the upgrade. These are the types of the upgrade (upgrade.ini):

```
MINOR      /* no process need to be stopped, no rebooting     */
REBOOT     /* a major upgrade of the c drive including operating system
              or and upgrade of running d: drive processes on a DCS
              300 with OS/2*/
SHUTDOWN   /* a major upgrade of the d drive that needs processes
              shut down. This will not be used until the DCS 300
              is migrated to Windows NT. The DCS 300 processes
              should be written with PC hooks to shut down the
              process remotely. */
SEVERE     /* a severe upgrade of the DCS 300 which includes
              repartitioning or a new operating system */
```

The SEVERE and SHUTDOWN upgrades will need to specify additional information (subsections) in the upgrade.ini.

1.2.4.3. Processes

The Processes header contains the processes that need to shut down. SHUTDOWN will need to specify which processes to stop, such as nextgen.exe or data collection. A NO means "don't shutdown processes" and a YES means "shutdown the process". For all other types of upgrades this subheading is ignored.

1.2.4.4. Changed\_Software

Changed software is only used for SEVERE and REBOOT upgrades. Changed software contains a list of the partitions that will have software updates. Changed software is used to indicate that the software in a partition has changed. For a SEVERE upgrade, If the partition size or file system will change, then, the corresponding setting here will also need to be set to YES because the software will have to be put back after the partition has been reformated.

1.2.4.5. Changed Partitions

Changed partitions is only used for SEVERE upgrades. All other types will ignore this information. Changed Partitions contains a list of the partitions that will be changed. If the partition is set to NO, it will not be, changed. If it is set to YES, it will be changed. Not all partitions will change. It is possible that only one will change (it didn't change size, it could change the file system perhaps). If the BOOT partition changed, the SWAPPER partition should also be changed. This is so the BOOT partition can change sizes. These will be set to one if data on the partition changed (files) or the partition information changed (size, file system, . . . ).

1.2.4.6. OS, SWAPPER, NEXTGEN, BOOT, BOOT_MANAGER

These headings are used only if they are set to YES in the Changed_Partitions heading. They are only used by SEVERE upgrades. All other upgrades ignore this information. The disk drive information is set here. There needs to be partition information for each partition the was set to YES in Changed Partitions.

The START parameter indicates if the partition is to be created at the bottom or top of the free space on the disk. The current file system is HPFS. This will be changed to FAT for Windows NT. The files system type is used by fdisk when the new partition is created and by format. Vtype indicates if the partition is primary or logical. Usually the operating system is on the primary partition and is on the c: drive. The size information is used to create the partition. These numbers must be correct for the different drive sizes (540M, 2.5 Gig, and 2.2 Gig) or fdisk will return an error. The name of the drive is important to delete the partition using fdisk. The name can be found by doing a fdisk /query. This will need to be done for all three sizes of drives (540M, 2.5 Gig, and 2.2 Gig). If other sizes of disk drives are used, the information will have to be added here too. These parameters are for fdisk.

If the name of the partition is not included in the os, swapper, nextgen, or boot sections (used only if the partition was set to YES in Changed_Partitions), then the partition will not be deleted. If the size was no included the partition will not be created. And, if the file system was not specified, the partition will not be formated.

For example, for DCS 300 ver 1.0, the swapper partition will need to be deleted, and recreated at a smaller size because there will be two new partitions. For the swapper partition, since it needs to be deleted, the name of the partition will need to be included. Since it also needs to be created at a smaller size the, the size should also be included as well as the file system. The nextgen and the OS partitions will not be deleted or recreated so the size, file system, and name information for the partitions should not be included. The information on the nextgen and the OS partitions will change, so OS and NEXTGEN should be set to YES under the changed software heading in upgrade.ini. Two new partitions will be created—the boot partition and the boot manager. The names for these should not be included because they didn't exist before.

1.2.4.7. Disk_Size

Disk size is the number of cylinders in the d: partition for each of the disk sizes. If a new hard drive is added, new entries will need to be added here. Currently in the field there are 540 Meg hard drives and 2.5 Gig hard drives. Soon there will be 2.2 Gig hard drives.

1.2.4.8. Video Fix

There are currently three type of video cards out in the field. For SEVERE upgrades and reboot upgrades, config.sys will be changed when creat_-ng is ran. Also, a new config.ngc might be copied over. If the files are changed, they will have to be changed to reference the correct video drivers. Fix_-Config will need to be set to YES if the config.ngc or config.sys is changed. If operating system is updated or replaced, then the video driver software for the correct card will have to be copied over to the appropriate directories. Copy_Files will need to be set to YES to cause the files to be copied over.

1.2.4.9. Version_Controller

The version controller will contain the range of software that can be upgraded.

For this release it will be 0200 ver 3.0 that can be upgraded. It can be a list or a range such as 300 ver 3.0–3.3, 3.5.

1.2.4.10. Example

An example upgrade.ini file that will be used for upgrades from 0200 Ver 3.0 to DCS 300 Ver 1.0 is included in the Computer Program Listing Appendix:

The type of upgrade shown in the example upgrade.ini file is SEVERE because the upgrade needs to delete and create partitions. The only partition that will be deleted is the swapper partition. It is being deleted to make room for two more partitions. The two new partitions are the alternate boot partition (BOOT) and boot manager. The swapper partition will be recreated at a smaller size. The and nextgen partitions will not be deleted or recreated, but new files will be copied over.

Since the swapper, the boot, and the boot manager partitions will change size, the SWAPPER, BOOT, and BOOT_MANAGER settings under changed_partitions are set to YES.

Data for all the partitions will change, so all the values in the Changed_Software are set to YES.

For the SWAPPER section, all the information for the partition is added except the name and size of the partition for the 2.2 Gig drive because none exist out in the field.

For the BOOT section, the boot partition name is not included because no boot partition was there before so no deletion of the partition will be attempted. The delete sections of the upgrade looks for the name of the partition to delete. If the name is NULL the section will be skipped. The new partition will be created at the top (START=TOP) of the free space on the hard drive.

For the BOOT_MANAGER section, the new partition will be created at the top (START=TOP) of the free space on the hard drive. The name is not included because boot manager was not installed before.

Creat_-ng will be ran, so Fix_-Config under Video_Fix will be set to YES.

For the Version Controller section, controller with 0200 Ver 3.0 software can be upgraded to DCS 300 Ver 1.0.

1.2.5. Upgrade.log file

Upgrade messages will be sent to the controller screen as well as to a file, upgrade.log. At the beginning of the upgrade, a default upgrade.log will be copied over to d:\upgrade. Phase 0 messages are used by ESD and 300UgradeUtil to determine if the DCS upgrade utility will proceed without errors. This is what the default message file looks like:

```
[PHASE]
   phase =
[DISK_SIZE]
   disk_size =
[VIDEO_CARD]
   VIDEO_CARD =
[ERROR_MESSAGES]
[SUCCESS_MESSAGES]
```

If the upgrade is SEVERE and the d: partition is to be deleted and recreated, the upgrade.log will be copied over to the f: drive befor the d: drive is deleted.

1.2.5.1. Phase heading

At the completion of each phase, the next phase to be ran is set here. There are currently six phases (0, 1, 2, 3 ,4, and 5). None of the upgrades use all six phases. The MINOR upgrade only uses phase 0 and phase 5. A REBOOT upgrade uses phase 0, phase 4, and phase 5. A SEVERE upgrade uses phase 0, phase 1, phase 2, phase 3, and phase 5. A SHUTDOWN upgrade only uses phase 0 and phase 5.

1.2.5.2. Disk Size heading

The disk size is written to upgrade.log if the upgrade is SEVERE. An IOCTL command is ran that queries the number of cylinders in drive.

1.2.5.3. Video Card heading

This is used for SEVERE and REBOOT upgrades.

1.2.5.4. Error Messages

These are the error messages that can be put in upgrade.log in phase 0:

Invalid disk size

Invalid zip files(s)

The upgrade files are not compatible with the DCS upgrade utility

The path for the upgrade files is incorrect.

The upgrade.ini is incorrect.

Incorrect number of parameters

DCS 300 ver x.x can not be upgraded to DCS 300 ver y.y. You must first upgrade to DCS 300 ver z.z the use this upgrade.

These are the error messages that can be put in upgrade.log in all other phases:

Creat_-ng failed. The error messages can be found in TBD.

The upgrade completed with errors

The upgrade could not complete

Error Copying files to C: Drive

Error Copying files to D: Drive

Error Copying files to F: Drive a Backup failure:

Restore failure:

"Could not open master system file list.

Restore is in progress . . .

Backup is in progress . . .

Target directory creation error.

ERROR-Access to drive denied

Could not open the migration list file.

1.2.5.5. Success Messages

These are the success messages that can be put in upgrade.log in phase 0:

DCS 300 ver x.x will be upgraded to DCS 300 version y.y.

0200 Controller ver 3.0 will be upgraded to DCS 300 version 1.0.

These are the success messages that can be put in upgrade.log in all other phases:

Successful upgrade 1.2.6. Save and Activate

If the /s parameter was passed in, a SEVERE and REBOOT upgrade will test to see if a save and activate is necessary. If the save and activate is necessary, the new default files will be copied over. Then data collection will be stopped, CM/2 will be ran, and then LAPs will be initiated. Timers will be used to wait to wait for data collection to stop, and for CM/2 setup and LAPs to finish.

1.2.7. Assumptions

1.2.7.1. Processes that need to be in place for the upgrade utility

It is assumed that there will be a config file that contains information on the software version. This will help control upgrades because the DCS 300's software version can be compared to the version controller in the upgrade files.

For ESD to start the DCS Upgrade Utility, a new functionality needs to be added that can spawn a command line utility based on a transaction.

The GUI needs to be changed to add the DCS 300 Upgrade Utility to the menu options. If the Upgrade Utility was selected, a new procedure in ngpblist.c will start the upgrade with the query option and examine the results in upgrade.log when the query is done. If there were no error in upgrade.log, the GUI will show a last chance box based on the type of upgrade (the type of upgrade is also in upgrade.log). If START was selected, the upgrade utility will be started without the query option.

The GUI needs to be changed to continuously check to see if there is an IPC call for a quiet save and activate. The upgrade utility will need to be able to do a quiet save and avtivate without rebooting or user input. Existing procedures like ActivateCfgOK, DcStopTimer, ActivateAfterStop, CheckCmsetup, ActivateAfterCM2, CheckLapsDone, and ActivateAflerLaps and the procedures they call will need to able to accept two more input parmater (quiet, or not quiet, and no reboot, or reboot possible).

1.2.7.2. Limitations

When an upgrade to DCS 300 ver 1 from 0200 ver 3.0 is done, no save and activate will occur because the changes to the DCS software are not in place. Also, the upgrade will need to be started from the command line for the same reasons.

The SHUTDOWN type of upgrade will not be used until the DCS 300 is migrated to Windows NT. The new DCS 300 processes should be written with IPC hooks to stop them remotely.

Much of the previous upgrade kit (upgrade to V3.0 on CD-ROM) can be used. Changes will need to be made to the sections, though. Phases of the upgrade will be used again with the addition of the upgrade parameter list in upgrade.ini.

1.2.8. Software Structure

1.2.8.1. ngpblist.c

For upgrades started from the GUI, code will need to be added to ngpblist.c to add the DCS 300 Upgrade Utility. A new dialog will be created when this option is selected. Under the create event of this dialog a new function (300UgradeUtil) will be added that will prompt the user for which directory the upgrade files are in. Based upon the choice, 300UgradeUtil will call upgrade.exe with these parameters: "upgrade /d:\upgrade /q", if "D: Drive" was selected or "upgrade /g:\upgrade /q" if the "CD-ROM" option was selected. Upgrade.exe will perform phase 0 of the upgrade and quit.

Phase 0 determines if the upgrade files are valid, extracts upgrade.ini from the upgrade files, determines if the upgrade.exe is compatible with the upgrade.ini, and determines the type of upgrade. The results of phase 0 is output to upgrade.log. Then upgrade.exe ends. The CreateUpgradeUtil function spawns the upgrade.exe. It then starts a xvt_timer and for each timer event generated, calls CkUpgradeLogFile. This function looks for the update.log file and when successfully opened verifies that no errors were generated by the upgrade.exe application. If errors are present, they are presented to the user in a XVT message dialog otherwise the success message that was written to the log file is displayed. If there were no errors, and based on the type of upgrade, a last resort box will show asking if the user wants to start or cancel the upgrade.

1.2.8.1.1. Pseudo-code for ngpblist.c

Pseudo-code for example procedures that SideButtonsMenuListOk calls for the upgrade utility are included in the Computer Program Listing Appendix in file "ngpblist.c." These procedures include:

SideButtonsMenuListOK
CreateUgradeUtil

1.2.8.2. UpgradeUtilOk (WINDOW xdWindow)

This function is called when the user clicks the OK button in the DCS Upgrade Utility dialog.

If CD-ROM was selected as the source then verify a CD is in the drive.

If not display an error.

Spawn the upgrade.exe application using the /q (query) option for a parameter.

Start the xvt_timer

1.2.8.3. CkUpgradeLogFile(VOID)

This function is called when a E_TIMER event is received in the DCS Upgrade Utility dialog.

Loop until a successful open is performed on the upgrade.log file or until nn timer events have be generated. If we time out, then inform the user and quit the process.

After a successful open is performed, parse the upgrade.log file using the function:

LONG FindValue (PSZ pszFilePath,
PSZ pszSection, /* "[ERROR_MESSAGES]*/
PCHAR szFindString)

If no errors are found then parse the file again and display the messages written under the "[SUCCESS_MESSAGES]" section in a xvt_note dialog.

When we return from the note dialog, parse the upgrade.log file and find the type, (section="[UPGRADE_TYPE]").

Based on the type, display the appropriate dialog (see functional spec. for the different levels of upgrades.

If the type is MINOR or SHUTDOWN, show the user a Start or Cancel type dialog allowing the user to proceed or abort the process. Upgrade.exe is again called with no paramters.

IF the type is REBOOT or SEVERE, show the user a Star or Canel type dialog along with a check box to Save and Activate their current configuration.

Upgrade.exe is again called and if the Save and Activate check box is checked, then /s is passed in as a parameter to the call.

1.2.8.4. Upgrade.exe

There are six phases to the upgrade. Phase 0 tests to see if the upgrade files are valid and examines the parameters of the upgrade. Phases 1, 2, and 3 are for SEVERE upgrades only. Phases 1, 2, and 3 delete, create, and format partitions. Phase 4 reboots the DCS 300 to the f: drive if the type of upgrade is REBOOT. MINOR and SHUTDOWN upgrades will jump from phase 0 to phase 5. Phase 5 extracts the zip files.

1.2.8.4.1. Phase 0

Phase 0 does these tests for each possible zip file:

A check is done to see if the zip file exists (it is not an error if it does not exist)

If it exists the upgrade.ini is extracted from it

If there wasn't an upgrade.ini and error is logged to upgrade.log and the upgrade ends.

If there was an upgrade.inii, its version is compared to the version of upgrade.exe.

If the versions don't match, an error message is logged in upgrade.log and the upgrade ends.

At this point, if there is no upgrade.ini, an error message is logged to upgrade.log and the upgrade ends. If there is an upgrade.ini the version of the DCS 300 is compared to the version controller in upgrade.ini. If the DCS version doesn't fall in the range in the version controller, an error message is logged to upgrade.log and the upgrade ends. Next the type of upgrade is retrieved and logged to upgrade.log. If it is a SEVERE upgrade, the disk size is also logged to upgrade.log. If no errors have occurred, the success messages is logged to upgrade.log. The message tells the current version of the DCS 300 and the version it is being upgraded to. If the "q" parameter was used to call upgrade.exe, the upgrade will end. If the "q" parameter was not used the phase is set to the proper value and the upgrade continues. The new phase is logged in upgrade.log.

1.2.8.4.2. Phase (used by SEVERE only)

The DCS 300 will do a save and activate if the /s parameter was passed in.

Phase 1 will extract upgdbkup.lst from one of the zip files and back up the users system files to the d:\upgrade directory. In phase 2 these files will be copied to the boot partition (f: drive).

If BOOT=YES was set in upgrade.ini, phase 1 will delete the swapper partition if the name was set in upgrade.ini. This is so the boot partition can change sizes. Next, the boot partition will be deleted if the the name was set in upgrade.ini. If the delete of the boot partition failed an error message recorded to upgrade.log. The old partition settings will be in the upgrade.ini. If the partitions were deleted successfully, the new boot partition will be created if the size is not equal to zero.

Phase 2 will be entered in the upgrade.log so that when the DCS reboots, phase two will be started.

A new config.sys and startup.cmd will be copied over the old so that when the DCS 300 reboots to the c: drive, the upgrade program will run.

Now the DCS 300 will reboot if it hasn't already.

1.2.8.4.3. Phase 2 (used by SEVERE only)

Phase two will format the swapper partition in the specified file system if the file system was set in upgrade.ini. If it fails, an error message will be recorded to upgrade.log and a error message will print to the screen and the upgrade will end. The DCS 300 is not functional but it is bootable to the C: drive.

If no error occur, the boot partition will be formatted in the specified file system if the file system was set in upgrade.ini. If an error occurs, an error message will be written to upgrade.log and the DCS 300 will be set up to boot up normally and the DCS will reboot to the C: drive. The DCS 300 is fully functional, but the upgrade failed. If no errors occur, boot_drive.zip will be exploded into the new drive and the backed up system files will be copied over as well as the upgrade.ini and upgrade.log files.

If errors occur during the copying, an error message will be written to upgrade.log and the DCS 300 will be set up to boot up normally and the DCS will reboot. The DCS 300 is fully functional, but the upgrade failed. If the e: drive was not deleted before, it can be now if SWAPPER=YES under the changed partitions heading in upgrade.ini. If it fails, an error message will be recorded to upgrade.log and a error message will print to the screen and the upgrade will end. The DCS 300 is fully functional.

If there was no errors and If NEXTGEN=YES under the changed partitions heading in upgrade.ini, the d: drive will now be deleted if the name was set in upgrade.ini. If it fails, an error message will be recorded to upgrade.log, the swapper partition will be recreated, an error message will print to the screen, and the upgrade will end. The DCS 300 is not functional but it is bootable to the C: drive.

If there was no errors and If OS=YES under the changed partitions heading in upgrade.ini, the c: drive will now be deleted if the was set in upgrade.ini. If it fails, an error message will be recorded to upgrade.log, an error message will print to the screen, and the upgrade will end. The DCS 300 is not functional but it is bootable to the c: drive.

If there were no errors, the deleted partitions will now be recreated through fdisk if the sizes were set in upgrade.ini. If a partition creation fails, an error message will be recorded to upgrade.log, an error message will print to the screen, and the upgrade will end. The DCS 300 is not functional and it is not bootable to the c: drive.

If no errors occur creating the partitions, the DCS will reboot to the f: drive if OS, NEXTGEN, or SWAPPER is set to YES under the changed partitions heading in upgrade.ini.

1.2.8.4.4. Phase 3 (used by SEVERE only)

Phase three will first format the os partition in the specified file system if the file system was set in upgrade.ini. If the format fails, an error message will be recorded to upgrade.log, an error message will print to the screen, and the upgrade will end. The DCS 300 is not functional and it is not bootable to the c: drive because there is no operating system on the c: drive. The DCS 300 was booted from the f: drive and is at a command prompt.

If there are no errors, the nextgen partition will be formatted in the specified file system if the file system was set in upgrade.ini. If the format fails, an error message will be recorded to upgrade.log, an error message will print to the screen, and the upgrade will end. The DCS 300 is not functional and it is not bootable to the c: drive because there is no operating system on the c: drive. The DCS 300 was booted from the f: drive and is at a command prompt.

If there are no errors, the swapper partition will be formatted in the specified file system if the file system was set in upgrade.ini. If the format fails, an error message will be recorded to upgrade.log, an error message will print to the screen, and the upgrade will end. The DCS 300 is not functional and it is not bootable to the c: drive because there is no operating system on the c: drive. The DCS 300 was booted from the f: drive and is at a command prompt. If there are no errors, the upgrade zip files are now ready to be exploded-increment the phase to 5 .

1.2.8.4.5. Phase 4 (used by REBOOT only)

The phase is set to 5 in the log file. The DCS 300 will do a save and activate if the /s parameter was passed in and if a save and activate is necessary. Now the DCS 300 will reboot.

1.2.8.4.6. Phase 5

If REBOOT was set in upgrade.ini, upgdbkup.1st will be extracted from one of the zip files. This is the list of files to be backed up and restored. The system files will be copied to the d:\upgrade\backup directory. If the backup fails, an error message will be recorded to upgrade.log, an error message will print to the screen, and the upgrade will reboot the DCS 300 to the c: drive. The DCS 300 is fully functional and operation will resume as normal except the upgrade did not complete successfully.

If the REBOOT parameter is set under the changed partitions heading in upgrade.ini, upgrade.exe will run CreatUpgradeTmpFile. This procedure will read the last successful section from ng_confg.log and copy it to a temp file to be used when creat_ng is ran. If the CreatUpgradeTmpFile fails, an error message will be recorded to upgrade.log, an error message will print to the screen, and the upgrade will reboot the DCS 300 to the c: drive. The DCS 300 is fully functional and operation will resume as normal except the upgrade did not complete successfully.

If the SHUTDOWN parameter is set under the changed partitions heading in upgrade.ini, the nextgen processes will now be stopped.

For all upgrades, the zip files will now be extracted to the appropriate drive and directories. If OS=YES under the changed_software heading in upgrade.ini, os_drive.zip will be exploded in the c: drive. If the unzip fails, an error message will be recorded to upgrade.log, an error message will print to the screen, and the upgrade will end. The DCS 300 is might or might not be functional and it might or might not be bootable. The status is unknown because the c: drive is corrupted. The DCS 300 was booted from the f: drive and is at a command prompt.

If there is no errors and NEXTGEN=YES under the changed_software heading in upgrade.ini, nextgen_drive.zip will be exploded in the d: drive. If the unzip fails, an error message will be recorded to upgrade.log, an error message will print to the screen, and the upgrade will end. The DCS 300 is might or might not be functional but it is bootable to the c: drive. The DCS 300 was booted from the f: drive and is at a command prompt.

If there is no errors and the REBOOT or SEVERE parameter is set, creat_ng will be ran to restore the user configuration. If the creat_ng fails, an error message will be recorded to upgrade.log, an error message will print to the screen, and the upgrade will reboot to the c: drive and end. The DCS 300 is functional but not configured.

If there is no errors and the REBOOT or SEVERE parameter is set, the procedure systemRestore will be ran to restore the backed up system files. If the systemRestore fails, an error message will be recorded to upgrade.log, an error message will print to the screen, and the upgrade will reboot to the c: drive and end. The DCS 300 is functional but not configured fully.

If there is no errors and the REBOOT or SEVERE parameter is set, the procedure EnableTcpipInConfigSys will be ran to start TCP/IP in the config.sys if it was set before. If TcpipInConfigSys fails, an error message will be recorded to upgrade.log, an error message will print to the screen, and the upgrade will reboot to the c: drive and end. The DCS 300 is functional but not configured fully.

If there is no errors and the REBOOT or SEVERE parameter is set, the procedure HostNAMeRestore will be ran to restore the host name in config.sys. If HostNAMeRestore fails, an error message will be recorded to upgrade.log, an error message will print to the screen, and the upgrade will reboot to the c: drive and end. The DCS 300 is functional but not configured fully.

If the REBOOT or SEVERE parameter is set, the DCS 300 will now reboot to the c: drive and be ready for normal operation.

If the SHUTDOWN parameter is set, the stopped processes will now be restarted.

If there was any errors configuring the controller f\ully, the user will have to reconfigure the DCS 300.

1.2.8.4.7. Pseudo-code for upgrade.c

The main body of upgrade.c calls these functions:
main
  SearchAndAddStringtoFilc
  FormatPartition
  DiskSize
  CreatePartitions
  IncrementPhase
  HostNameRestore
  FindValue
  UpdtConfigLog
  SystemBackup
  SystemRestore
  CreateUpgradeTmpFile
  DosExecPgmWrapper
  EnableTcpipInConfigSys
  SaveAndActivate
  RestoreVideoType( )
  SaveVideoType( )

A copy of pseudo-code for an example "upgrade.c" file is included in the Computer Program Listing Appendix.

1.2.8.4.8. Pseudo-code for Upgrade.h

A copy of pseudo-code for an example header definition is included as file "upgrade.h" in the Computer Program Listing Appendix.

1.2.9. Data Organization

Changes will be made to a SysMaintitems structure in a ngextrn.h file. A copy of an example header definition is included as file "ngextm.h" in the Computer Program Listing Appendix.

What is claimed is:

1. A system for automatically upgrading software on a device, the system comprising:
  a client device having memory for storing software;
  a server having memory for storing at least one version of a client upgrade software selectively loadable to the client device and executable thereby;
  a network providing data communication between the server and the client device;
  a server utility stored on the server and executable thereon, the server utility capable of determining a configuration of the client device and initiating a software upgrade of the client device based on the determined configuration of the client device; and
  a client utility stored on the client device and executable thereon, the client utility capable of determining an availability of a specific version of the client upgrade software on the server and initiating a software upgrade of the client device based on the determined availability of the specific version of client upgrade software on the server;
  wherein a software upgrade of the client device comprises an installation of a new operating system; and
  wherein the installation of the new operating system comprises:
    an archive of an application and a set of user data of the client device on the server;
    an installation of a new version of the operating system corresponding to the configuration of the client device;
    an installation of a new version of the application optimized to the new operating system; and
    a restoration of the set of user data.

2. The system of claim 1, wherein the client device is an automated data collection device.

3. The system of claim 1, wherein the server utility stores the configuration of the client device on the server.

4. The system of claim 1, wherein the client utility periodically contacts the server to determine the availability of a specific version of client upgrade software on the server.

5. The system of claim 1, wherein the server utility is scheduled to contact the client device at a requested time to determine the configuration of the client device.

6. The system of claim 1, wherein the software stored on the client device comprises:
an operating system;
an application; and
a set of user data.

7. The system of claim 1, wherein the client upgrade software is provided to the client device as a software packet comprising:
a software distribution protocol; and
a network protocol.

8. The system of claim 1, wherein the server utility is capable of organizing a plurality of client devices into a logical group and allow for a single event to initiate a software upgrade of each of the client devices in the logical group.

9. A method for automatically upgrading software on a client device, the client device having memory for storing software, the method comprising:
storing on a server at least two versions of client upgrade software selectively loadable to the client device and executable thereby;
providing data communication between the client device and the server through a network;
providing a server utility stored on the server and executable thereon, the server utility in a first instance initiating an installation of a first version of client upgrade software on the client device; and
providing a client utility stored on the client device and executable thereon, the client utility is capable of determining an availability of a specific version of client upgrade software on the server, the client utility in a second instance initiating an installation of a second version of client upgrade software on the client device;
wherein an installation of a version of client upgrade software on the client device comprises an installation of a new operating system; and
wherein the installation of the new operating system comprises:
determining a configuration of the client device;
archiving an application and a set of user data of the client device on the server;
providing a version of installation software of the new operating system to the client device corresponding to the configuration of the client device;
rebooting the client device;
installing a version of the archived application optimized to the new operating system on the client device; and
restoring the archived set of user data to the client device.

10. The method of claim 9, wherein the first instance occurs prior to the second instance.

11. The method of claim 9, wherein the second instance occurs prior to the first instance.

12. The method of claim 9, wherein the client device is an automated data collection device.

13. The method of claim 9, wherein the server utility determines a configuration of the client device.

14. The method of claim 13, wherein the server utility stores the configuration of the client device on the server.

15. The method of claim 9, wherein the software stored on the client device comprises:
an operating system;
an application; and
a set of user data.

16. The method of claim 9, wherein the client upgrade software is provided to the client device as a software packet comprising:
a software distribution protocol; and
a network protocol.

17. A method for automatically upgrading software on a client device, the client device having memory for storing software, the method comprising:
storing on a server a plurality of versions of client upgrade software selectively loadable to the client device and executable thereby;
providing data communication between the client device and the server through a network;
providing a server utility stored on the server and executable thereon, the server utility from time to time initiating an installation of a first version of client upgrade software on the client device; and
providing a client utility stored on the client device and executable thereon, the client utility is capable of determining an availability of a specific version of client upgrade software on the server, the client utility from time to time initiating an installation of a second version of client upgrade software on the client device;
wherein an installation of a version of client upgrade software on the client device comprises an installation of a new operating system; and
wherein the installation of the new operating system comprises:
determining a configuration of the client device;
archiving an application and a set of user data of the client device on the server;
providing a version of installation software of the new operating system to the client device corresponding to the configuration of the client device;
rebooting the client device;
installing a version of the archived application optimized to the new operating system on the client device; and
restoring the archived set of user data to the client device.

18. The method of claim 17, wherein the time intervals between installations of client upgrade software on the client device is continuous.

19. The method of claim 17, wherein the time intervals between installations of client upgrade software on the client device is periodic.

20. The method of claim 17, wherein the client device is an automated data collection device.

21. The method of claim 17, wherein the server utility determines a configuration of the client device.

22. The method of claim 21, wherein the server utility stores the configuration of the client device on the server.

23. The method of claim 17, wherein the software stored on the client device comprises:
an operating system;
an application; and
a set of user data.

24. The method of claim 17, wherein the client upgrade software is provided to the client device as a software packet comprising:
a software distribution protocol; and
a network protocol.

* * * * *